ELECTRICAL CIRCUIT ARRANGEMENT
FOR STANDARD FREQUENCY SOURCES
Filed Feb. 4, 1952

Inventors
E. T. A. Phillips
J. Needham
By Stevens, Downing & Sebold
Attys.

Patented Aug. 17, 1954

2,686,874

UNITED STATES PATENT OFFICE 2,686,874

ELECTRICAL CIRCUIT ARRANGEMENT FOR STANDARD FREQUENCY SOURCES

Eric Thomas Arthur Phillips and Jack Needham, Beckenham, England, assignors to Muirhead & Company Limited, Beckenham, England Application February 4, 1952, Serial No. 269,822

Claims priority, application Great Britain February 8, 1951

2 Claims. (Cl. 250—36)

This invention relates to electrical circuit arrangements for standard frequency sources.

A source of standard frequency of the type herein considered must have:

(1) a frequency controlling element (for example, a tuning fork);

(2) a source of energy or generator which will make good the dissipated power in the controlling element and maintain the latter in a state of oscillation;

(3) a limiter, to establish the maximum power level delivered to the controlling element and the amplitude of the oscillation described by the controlling element, which may be (and usually is) inherent in the generator design.

For the correct operation of the standard frequency source the generator must have negligible effect on the frequency selective properties of the controlling element and the conditions to be fulfilled are:

(1) the amount of the supplied power shall be constant;

(2) the phase of the supplied power shall be constant, i. e. the phase of the driving voltage to the controlling element shall be the same as the phase of the output voltage of the element. This demands substantially zero phase shift in the generator;

(3) the limiting of the supplied power shall be symmetrical i. e. both half-cycles of alternating current and voltage shall be of equal magnitude and of the same wave form.

An object of the invention is to obtain a greater degree of stability of frequency, with a relatively simple circuit, than has hitherto been possible.

The invention consists of an electrical circuit arrangement for a standard frequency source comprising two thermionic valves or sections of thermionic valves being triodes or multigrid valves, forming a valve amplifier, so connected as to give a low anode impedance, anode load impedances, which may conveniently be equal, connected between the anodes of the valves and a common H. T. lead, the value of which anode load impedances is so chosen as to provide the required power level to a frequency controlling element, a common cathode impedance for the two valves or valve sections so chosen as to be large compared with the two anode and anode load impedances in parallel and potential dividing resistances so chosen as to provide the desired potential difference between control grids and cathodes of the valves.

Conveniently, the two control grids will be respectively connected to the two ends of the input circuit of the frequency control element.

An embodiment of the invention will be described with reference to the accompanying drawings.

Figure 1:
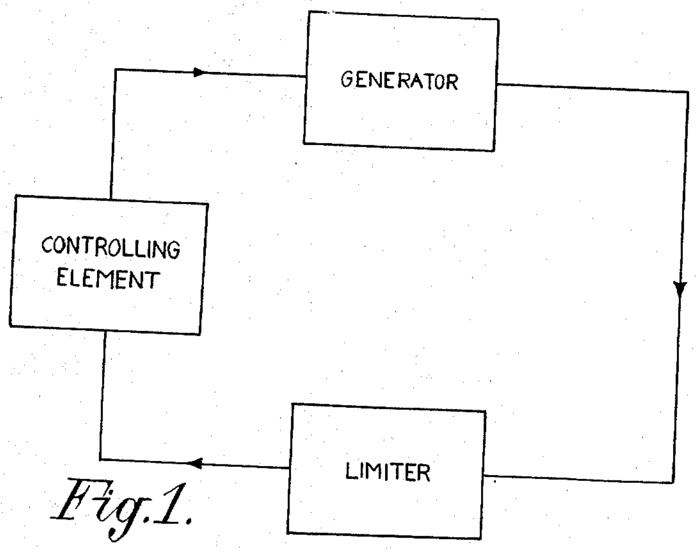
Figure 1 is a block diagram illustrating the principle of a standard frequency arrangement.
Figure 2:
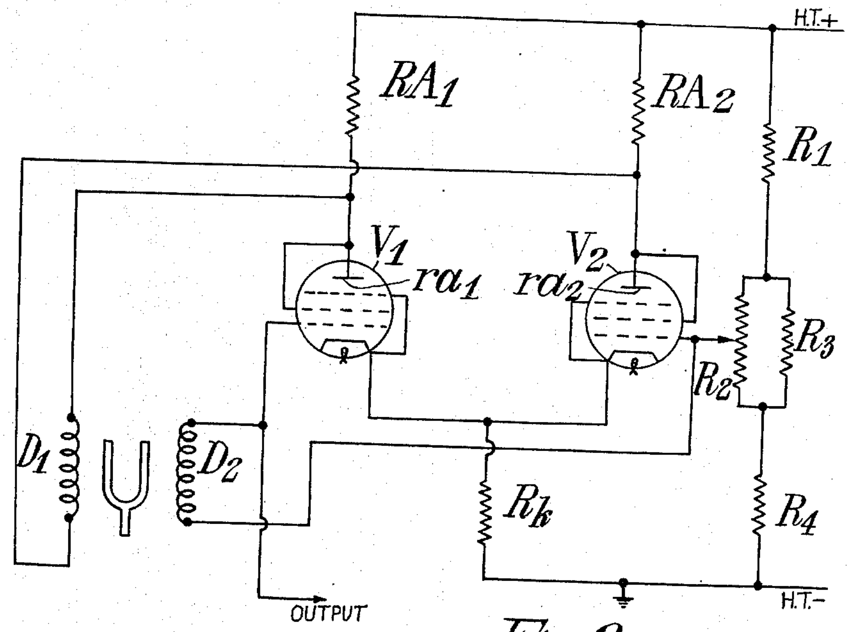
Figure 2 is a diagram of a circuit according to the invention.

$V_1$ and $V_2$ are two valves, or sections of valves, being triodes or multigrid valves so connected as to give a low anode impedance $ra_1$ and $ra_2$ in any manner familiar to those versed in the art. $RA_1$ and $RA_2$ are equal anode load impedances, so chosen as to provide the required power level to the frequency controlling element (for example, tuning fork driving coil $D_1$ as shown). $Rk$ is a common cathode impedance, so chosen as to be large compared with $RA_1$ and $ra_1$ in parallel with $RA_2$ and $ra_2$. $R_1$, $R_2$, $R_3$ and $R_4$ are potential dividing resistances so chosen as to provide the desired potential difference between control grids and cathodes of $V_1$ and $V_2$. A D. C. connection must be established between the control grids of $V_1$ and $V_2$, this normally being provided by the grid driving circuit (for example, the tuning fork output coil $D_2$).

This circuit satisfied the three named conditions for a standard frequency source, in the following manner:

(1) Constant amount of supplied power is provided by automatically maintaining at a constant value the overall gain of the amplifier. This is achieved by virtue of the cathode resistance RK being great compared with the effective resistance of anode and anode load ($Ra$ and $ra$) thus ensuring that the cathode currents, and hence the anode-cathode voltages of the two valves, are substantially constant. Variations of heater-filament potential (which can be regarded as variations of cathode potential) have, therefore, substantially no effect upon the mutual conductance of the valves and consequently no effect upon the overall gain of the amplifier.

Variations in HT are also minimised in effect. If the H. T. supply is increased, the current through the valves tends to increase with consequent reduction in the $ra$ of the valves and a greater than proportional voltage is developed across RK which tends to restore the anode-cathode voltage to its previous level. Additionally this increment of voltage across RK will increase the potential difference between the cathode and grids of the valves, thus reducing the mutual conductance of the valves. A similar argument applies for the case where the H. T. supply is reduced below the nominal value and the circuit may be seen to be self-compensating.

The inclusion of the large cathode resistance RK in the circuit reduces the errors remaining due to lack of complete self-compensation developed by the valve, the improvement obtained being proportional to the value of the expression $$\frac{RK}{\frac{RA+\gamma a}{2}}$$

(2) The circuit as described contains no reactive coupling components; therefore the phase shift of a signal through it is confined to the effect of valve inter-electrode capacitance. This capacitance can be neglected at the frequencies used, and the phase shift is then effectively zero.

(3) The limiting of the driving voltage applied to the controlling element is effected by the reduction of the anode/cathode potential of the valve which is being driven positively, to the point where the amplification factor of that valve tends to reduce below that which is required to maintain the complete circuit in oscillation. Within normal valve manufacturing tolerances and in the circuit described, this action occurs at the same point on the IA/VA characteristics of the two valves, and since the input to the frequency controlling element is taken differentially from the anodes of the two valves in the circuit, it follows that limitation of each half-cycle occurs at the same voltage level.

Thus, using an alternating current source of energy, variation of the power supply either in frequency or voltage does not affect the frequency standard. Furthermore, ageing of valves through continuous use has little effect on the standard frequency and the replacement of valves can be carried out without readjustment or rebalance of the circuit while still maintaining the constancy of the standard. The degree of constancy achieved by the invention is of the order of 2 or 3 parts in a million of the standard frequency, assuming no deterioration of the controlling element itself.

Where necessary fine adjustments of frequency may be made by small variations of the anode loads both being adjusted together (or individually within small limits). Alternatively, or additionally, small differential variations of the potential divider may be made.

Where necessary, transformers may be employed between the amplifier and the frequency controlling element and vice versa, provided that such transformers produce substantially zero phase-shift at the frequency of oscillation of the said frequency controlling element.

Various modifications may be made within the scope of the invention.

We claim:

1. In a standard frequency source of the type having a frequency determining element of the electromechanical vibrator type including a driving power input section comprising an untapped inductance coupled to said element, and a power output section comprising another untapped inductance coupled to said element, a pair of thermionic valves connected differentially as triodes and having anode, cathode and control grid electrodes, a source of anode supply voltage having its positive terminal connected to each anode through a respective anode load impedance, an unbypassed common cathode impedance connected from both valves to the negative terminal of said source, the value of said cathode impedance being large compared to the parallel combination impedance of the anode and anode load impedances of said valves, a potential divider across said source supplying grid bias potential to one of said valve grids, a circuit substantially free from phase shift directly connecting the terminals of the output section of said vibrator to said respective grids, and a circuit substantially free from phase shift connecting the terminals of said power input section of the vibrator directly to said respective anodes.

2. The invention in accordance with claim 1, in which the respective anode load impedances are equal.

References Cited in the file of this patent

UNITED STATES PATENTS

| Number | Name | Date |
|---|---|---|
| 2,300,271 | Whitaker | Oct. 27, 1942 |